April 14, 1936.　　　　R. E. DUNHAM　　　　2,037,621
TILLAGE COMBINE
Filed March 1, 1934　　　　2 Sheets-Sheet 2
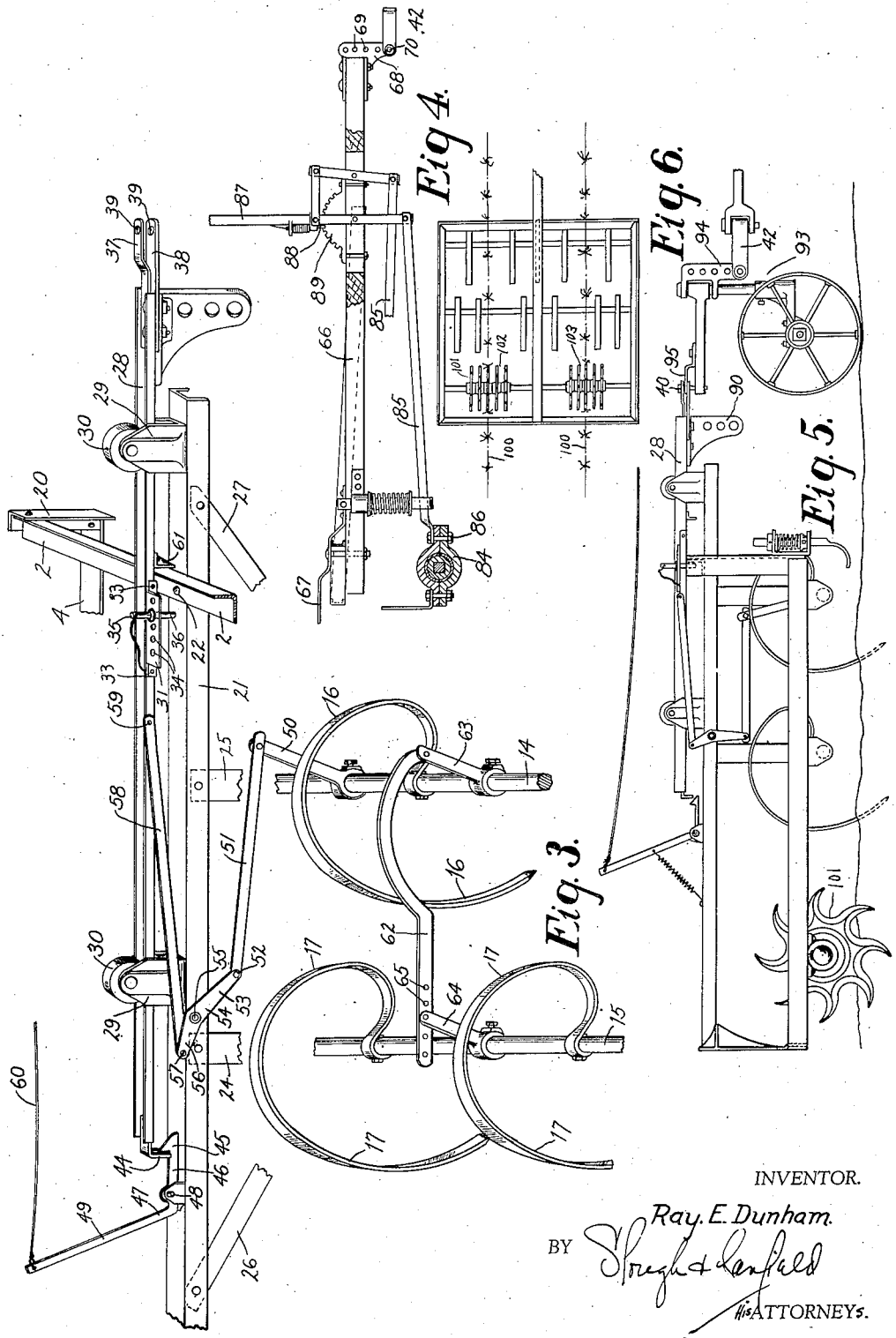
INVENTOR.
Ray E. Dunham.
BY
His ATTORNEYS.

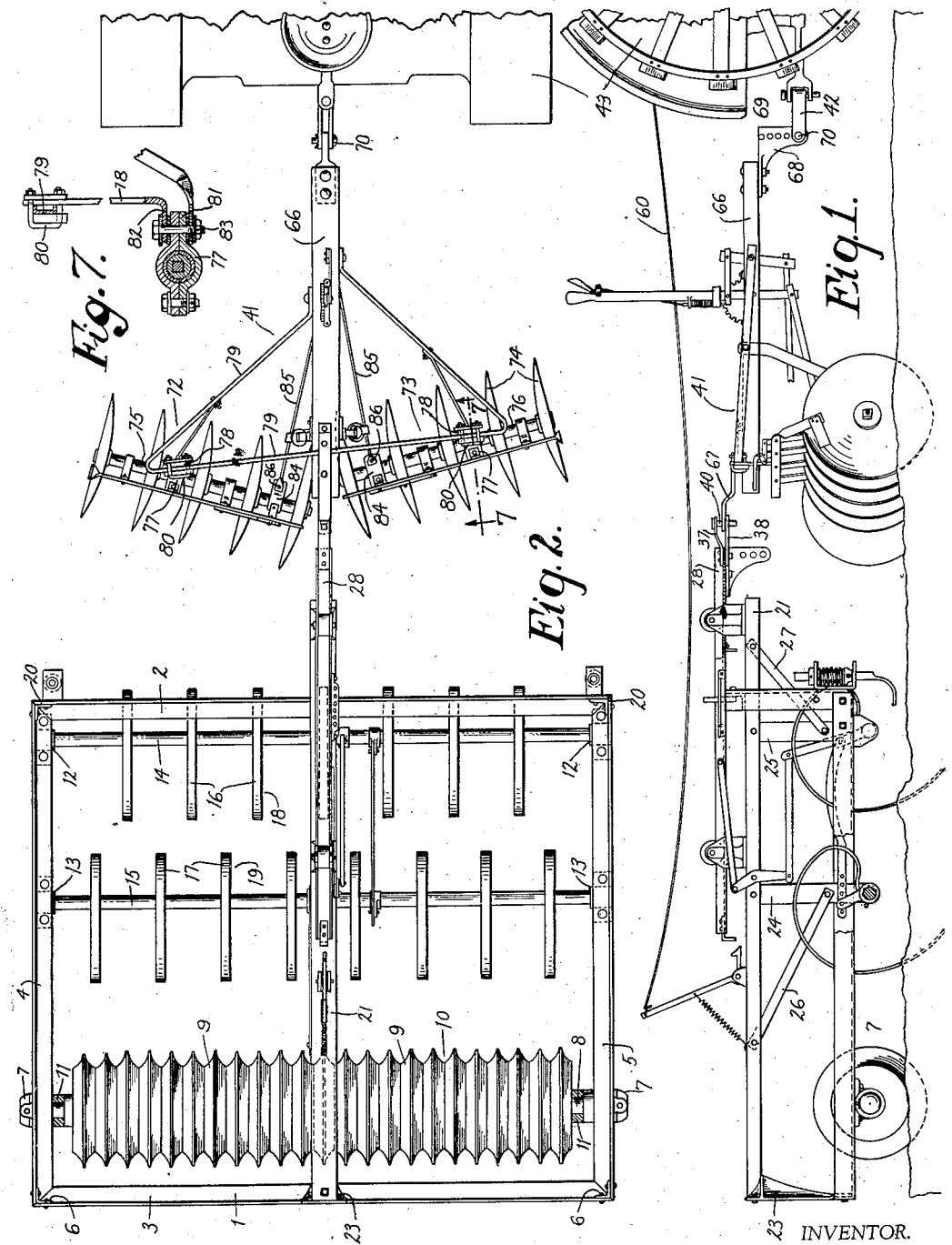

Patented Apr. 14, 1936

2,037,621

UNITED STATES PATENT OFFICE 2,037,621

TILLAGE COMBINE

Ray E. Dunham, Berea, Ohio, assignor to The Dunham Company, Berea, Ohio, a corporation of Ohio Application March 1, 1934, Serial No. 713,589

6 Claims. (Cl. 55—12)

This invention relates to agricultural implements and particularly to implements for tilling the soil to prepare it for seeding and to cultivate growing crops.

It has heretofore been the general practice in preparing ground for seeding to first plow the soil, then to harrow, roll, drag and pack the same to reduce the soil to a finely broken but compact condition with moisture conserving mulch on the surface. Attempts have been made to provide a single tillage combine whereby all of these operations may be performed at a single passage of the combined implement over the ground, and it is more particularly to this last named class of implements that the instant invention relates.

It is an object of this invention to provide an improved tillage implement whereby the soil may be prepared for a seed bed as described by a single passage of the implement over the ground.

Another object is to provide a tillage implement of the class referred to whereby the ground may be worked, in an improved manner, to a substantially uniform depth regardless of differences in the hardness and texture of the soil in different parts of a field.

Another object is to provide, in an implement of the class described, employing resilient ground working tools, improved means for preventing said tools from unduly shifting laterally and from unduly springing outwardly from a predetermined working depth, upon encountering hard portions of the soil being worked.

Another object is to provide a combined tillage implement of the class referred to adaptable to cultivate row crops in an improved manner.

Another object is to provide, in an implement of the class referred to, employing tools working at a substantial depth in the soil, improved means for effecting withdrawal of the tools from the soil to facilitate maneuvering of the implement on the ground.

Another object is to provide, in an implement of the class referred to employing ground working tools adapted to be elevated above the ground level for maneuvering the implement on the ground, improved means for projecting the said tools into the soil at a predetermined depth.

Another object is to provide, in an implement of the class referred to employing tools working at a substantial depth in the soil, and adapted to be propelled over the ground by draft power, means whereby the draft power may be utilized to project the tools into the soil to a predetermined depth, or, optionally, to withdraw them from the soil.

Other objects will be apparent to those skilled in the art to which my invention appertains.

My invention is fully disclosed in the following description taken in connection with the accompanying drawings, in which:

Fig. 1 is a side elevational view of an implement embodying my invention and illustrating part of a propelling tractor hitched thereto;

Fig. 2 is a top plan view of the implement of Fig. 1;

Fig. 3 is a perspective view illustrating to a larger scale a part of the mechanism illustrated in Figs. 1 and 2;

Fig. 4 is a fragmentary view to a larger scale of a part of the mechanism of Figs. 1 and 2 with parts broken away for clearness;

Fig. 5 is a view generally similar to Fig. 1 illustrating a modification;

Fig. 6 is a simplified plan view of the implement of Fig. 5 illustrating its adaptation to perform cultivating operations; and Fig. 7 is a fragmentary sectional view taken from the plane 7 of Fig. 2.

Referring to the drawings, I have shown generally at 1 a preferably rigid rectangular frame comprising front and rear end members 2 and 3 and side members 4 and 5 preferably formed from angle iron and rigidly joined at the rectangle corners by steel or malleable iron corner pieces 6—6. Upon the rearward ends of the side members 4 and 5 are secured supports 7—7 supporting the ends of a transverse shaft 8 upon which is mounted a gang of discs 9—9, the gang being indicated generally at 10. The discs 9—9 have peripheries generally V-shaped in cross-section and are rotatably mounted on the shaft 8. Discs of this general construction and the operations which they perform are believed to be generally well known and understood in this art, and although the operations which they perform in the present invention are in some respects different from those which they have heretofore performed, it is believed that no further description thereof is necessary at this point herein. While the discs 9—9 are mounted to freely rotate individually on the shaft 8, they are prevented from axially shifting by suitable blocks 11—11 disposed on the shaft between the outermost or end discs and the shaft supports 7—7 above described.

On the forward and intermediate portions of the side bars 4 and 5 are provided opposite pairs of supports 12—12 and 13—13 in which are oscillatably supported transverse shafts 14 and 15 on each of which is secured a plurality or gang of spring-type harrow teeth 16—16 and 17—17 respectively, the preferred mounting for the same on the shaft being illustrated in perspective in Fig. 3, and the respective gangs of spring harrow teeth being indicated generally at 18 and 19.

The spring teeth of the gangs 18 and 19 and the mountings therefor may be variously formed and constructed. Such elements are well known in this art. It is only essential for the purposes of the instant invention that the inner or non-yielding ends of the spring teeth be rigidly connected to the shafts 14 and 15 to oscillate therewith and that the free or resilient ends of the teeth be relatively stiff, that is to say, generally resilient but yielding resiliently only upon encountering relatively hard portions of the soil when drawn through the ground in a manner to be described. All of the teeth of both gangs 18 and 19 are adapted to be revolved around the axes of the shafts 14 and 15 to raise them out of the ground or to thrust them into the ground by a mechanism to be described.

While spring teeth in the gangs 18 and 19 of known form may be employed, it is desirable that the ground working end portions of the spring teeth be shaped so that when they are rocked with the shafts 14 and 15 so as to thrust them into the soil, they will slope upwardly rearwardly whereby when propelled through the soil forwardly in a manner to be described, they will plow or turn over the soil and lift to the surface clods and the like.

The forward end bar 2 is preferably elevated above the plane of the side bars 4 and 5 and the rear end bar 3; and to this end, its opposite transverse ends are supported on risers 20—20 secured at their lower ends to the forward ends of the side members 4 and 5 and at their upper ends to the front end member 2. A longitudinally extending generally central bar 21, preferably formed from channel iron, is riveted to the under side of the front end member 2, as shown at 22 in Fig. 3, preferably at the middle thereof, projecting forwardly a substantial distance from the end member 2 and rearwardly thereof, being supported upon the upper end of a post 23 the lower end of which is secured to the middle part of the rear end member 3. The central bar 21 is preferably parallel to the side members 4 and 5.

A pair of depending hangers 24 and 25 are riveted at their upper ends to the central bar 21 and at their lower ends are provided with perforations enclosing the shafts 15 and 14, respectively. Brace members 26 and 27, diagonally disposed, are riveted at their upper ends to the center bar 21 and at their lower ends respectively to lower portions of the hangers 24 and 25.

By the frame construction just described, forwardly propelling draft applied to the center bar 21 in a manner to be described, may propel the implement forwardly.

A draft bar 28, preferably formed from channel iron, is mounted above the central bar 21 and guided for movement in a longitudinally spaced pair of U-shaped guides 29—29 secured at the closed end of the U upon the upper side of the central bar 21. Rollers 30—30 are mounted in the guides 21 above the draft bar 28 to absorb substantially without friction drag upwardly vertical thrusts on the draft bar 28 during longitudinal movement thereof, as will presently be explained. A bracket 31, preferably formed from angle iron, has the vertical flange 32 thereof riveted to a side of the draft bar 28 as at 33, and the horizontal flange thereof is provided with a longitudinal series of holes 34—34. A pin 35 is provided for insertion in one or another of the holes 34 and has a shank 36 extending substantially below the bracket 31.

The draft bar 28 is disposed so as to rest upon the upper side of the front end bar 2 as shown in Fig. 3 or may be suitably guided in the guides 29—29 so as to be disposed adjacent to the upper side of the bar 2. The forward end of the draft bar 28 has a hitch secured thereto comprising vertically spaced hitch members 37 and 38 provided with vertically aligned perforations 39—39 through which a king pin 40, Fig. 1, may be projected to connect the draft bar 28 with a forward unit 41 of the implement to be described which in turn is adapted to be connected to a tractor draw bar 42 whereby the tractor indicated at 43 may exert draft upon the draft bar 28 above described.

The rearward end of the draft bar 28 is provided with a downwardly extending hook member 44 normally engaged with a pawl 45 on one leg 46 of a bell crank lever 47 pivotally mounted as at 48 upon the upper side of the central bar 21, the other leg 49 of the bell crank extending upwardly vertically therefrom.

Upon the application of forward draft to the draft bar 28 as above described, the draft will be transmitted through the hook member 44 and bell crank lever 47 to the central bar 21 and thence to the braced frame structure above described to propel the rearward implement unit above described forwardly.

With the parts in the normal position shown, the spring teeth 16 and 17 are in their withdrawn positions, being maintained in that position by the following mechanism. A crank arm 50 is connected at one end to the forward shaft 14, extends upwardly therefrom and at its upper end is pivoted to a connecting rod 51 at one end thereof, the other end of which is connected as at 52 to the long arm 53 of a bell crank lever 54 pivoted as at 55 to the central bar 21. The short arm 56 of the bell crank 54 is pivoted as at 57 to a connecting rod 58, extending forwardly therefrom and pivotally connected as at 59 to the draft bar 28. A rope 60 is connected to the upper end of the bell crank lever 49 and extends forwardly therefrom over the entire implement and is secured at its other end at a convenient point on the tractor 43. The operator of the tractor may at will cause the retracted spring teeth to be moved from their elevated or retracted position downwardly into the ground and be projected in the ground to a predetermined depth by the forward draft power of the tractor as follows:

By pulling or jerking on the rope 60, the bell crank 47 will be rocked clockwise as viewed in the drawings, tripping the pawl 45 from the hook member 44. The draft bar 28 is then free to be moved forwardly by the draft of the tractor, carrying with it the connecting rod 58 which thereby rocks the bell crank lever 54 clockwise, pulling rearwardly on the connecting rod 51 and on the upper end of the arm 50 thereby rocking the shaft 14 counter-clockwise. Any resistance to penetration into the soil by the spring teeth is overcome by the draft of the tractor pulling on the draft bar 28, so that the teeth will be projected into the soil. The projection of the teeth into the soil will stop when the pin end 36 moves forwardly into engagement with the forward end member 2 and thereafter the draft on the draft bar 28 will be transmitted to the implement unit through the pin 36 and forward member 2 to the central bar 21 etc.

Whenever in the operation of the implement it becomes desirable to retract the spring teeth out of the ground, this may be done, utilizing the power of the tractor, by first stopping the tractor and then reversing it to back it up to apply rearward draft on the draft bar 28, causing this bar to move relatively to the frame and thereby moving the connecting rod 58 toward the left as viewed in the drawings, rocking the bell crank 54 counter-clockwise and moving the connecting rod 51 toward the right, rocking the arm 50 clockwise to turn the shaft 14 clockwise and pull the teeth out of the ground. The rearward motion of the draft bar 28 may be stopped by a lug 61 on the under side of the draft bar 28 engaging the forward frame member 2 when the teeth have been withdrawn suitably out of the ground. Further rearward movement of the tractor will move the entire rearward implement unit rearwardly.

The above described movement of the shaft 14 moves the spring teeth 16 in and out of the ground by the power of the tractor. The spring teeth 17 are simultaneously moved in and out of the ground, the movement being transmitted to the shaft 15 by a connecting rod 62 pivoted at opposite ends to the upper ends of arms 63 and 64 the lower ends of which are rigidly secured to the shafts 14 and 15 respectively. The rearward end of the connecting rod 62 may have a plurality of holes 65—65 to vary the position of the teeth 17 with respect to the teeth 16. In some cases it has been found deisrable that the forward teeth 16 may penetrate the ground to a lesser distance than the rearward teeth 17, and by the means described this difference of penetration of the forward and rearward gangs respectively may be adjustably varied without interfering with the simultaneous elevation and lowering of the teeth in a manner described.

The parts above described are so arranged that before the lug 61 on the draft bar 28 is stopped on the forward end member 2, the hook member 44 will have engaged the pawl 45 to maintain the teeth in the elevated position after the rearward draft of the tractor is removed.

As above indicated, the implement embodying my invention is preferably in two units, a rearward unit and a forward unit connected by the king pin 40. The forward unit will now be described.

The forward implement unit comprises a central longitudinally extending frame element 66 having at its rearward end a rearwardly extending tongue 67 perforated to receive the king pin 40 and adapted to be disposed between the hitch members 37 and 38; and on the forward end of the frame element 66 is a clevis element 68 having a vertical series of perforations 69—69 with which, selectively, connection may be made by a pin 70 with the tractor draw bar 42.

A pair of gangs 72 and 73 of dished discs 74—74 are provided, the discs of the gang 72 being mounted on a shaft 75 to rotate therewith, and the discs of the gang 73 being similarly mounted on a shaft 76. The respective shafts are rotatably supported in bearings 77—77 on depending hangers 78 secured by U-bolts 80 to a frame 79 connected to the frame element 66. The bearings have horizontal flanges 81 and the hangers 78 have horizontal feet 82. Bolts 83 projected through the flanges and feet provide vertical bearings on which the respective disc gangs as a whole may rotate to adjust their angular relation to the forward direction of draft.

Bearings 84—84 are provided on the shafts 75 and 76 and links 85—85 connected to the bearings 84 by vertical bolts 86—86 have their forward ends connected to a lever 87 pivoted on the frame element 66 and the lever has a dog 88 cooperating with a toothed sector 89. By this construction when the lever 87 is rocked to different positions determined by the toothed sector 89, the gangs 72 and 73 of the discs may be rocked around the bearing pins 83—83 to adjustably change their angle of draft and may be locked in any adjusted position by the dog 88.

The construction of the forward implement unit as just described constitutes no essential part of my invention. Any construction comprising a plurality of disc gangs having dished discs rotatable through the soil when propelled forwardly, and adjustable to various angles with the line of draft, may be employed. It is essential, however, that in a rearward part of such unit there be provided an element such as the element 67 with which a forward portion of the rear unit may be engaged to prevent the latter from rising above a predetermined level to maintain the spring teeth of the rearward unit from rising out of the ground above their predetermined level as above described, the downward force necessary to effect this result being provided partly by the weight of the forward disc unit but largely by the downward suction of the angularly set discs thereof.

As is well known, such gangs of disc when propelled forwardly by the tractor will plow and turn the soil to a depth depending upon the degree of angularity of the gangs.

The forward unit 41 of the complete implement functions to work the soil in a manner similar to that of disc harrows of known construction and in addition supports the forward end of the draft bar 28 of the rearward unit, and being connected to the rearward unit through the king pin 40, may turn relative to the rearward unit around the king pin to cause the two units to follow the tractor and to facilitate turning the units at the end of a field.

In the operation of the combined implement above described, as the implement is pulled over the surface of the soil, the disc gangs 72 and 73 plow and partly pulverize the soil to a relatively shallow depth. This operation is immediately followed by the spring teeth set to the desired depth which plow up the soil to a greater depth, raising to the surface clods and lumps.

The spring tooth operation is substantially a plowing operation, elevating and turning the soil to substantially a uniform depth. The soil which was crushed or pulverized by the disc gangs 72 and 73 is sifted down into the coarsely broken soil left by the spring teeth. The unbroken clods and the like are left on the surface. The rear gang of discs 10 immediately follows and pulverizes the clods and lumps raised by the teeth and left on or near the surface. The soil is thus left completely mulched and packed to substantially the full working depth of the spring teeth.

I find that by the employment of the implement above described, the several operations of discing, harrowing, packing, rolling, dragging or the like, heretofore usually performed to prepare a seed bed after plowing, may be entirely omitted; and even where the soil is covered with sod, the traditionally necessary initial plowing operation may be omitted. Thus the soil however tough and unworked by previous crop rotation, may be reduced to a finished seed bed by a single passage thereover of the implement.

The gang 19 of discs is preferably very heavy, a suitable number of discs for example weighing 500 pounds or more per gang; and the suction of the forward disc gangs 72 and 73 is capable of exerting great downward pull on the end of the draft bar 28. The spring teeth therefore are prevented from resiliently rising or jumping out of the soil upon encountering hard portions thereof and are held in the ground to the desired predetermined depth and in a manner greatly superior to that when a spring tooth harrow of prior construction is employed alone as in prior practice. Furthermore, the peripheral shape of the discs of the gang 19 and the thin dish form of the discs of the gangs 72 and 73 interlock these discs with the soil in a manner to prevent lateral shifting thereof so that the spring teeth are furthermore prevented from shifting or skidding or jumping laterally upon encountering hard or uneven soil below the surface.

The spring teeth being preferably chosen to be relatively stiff, these objectionable movements in the operation of harrow teeth usually employed, that is, the resilient jumping or springing upwardly and skidding laterally in the ground, are thus reduced to a negligible minimum.

The operation performed by the spring teeth is superior to and hardly comparable with that performed by similar teeth in known types of spring tooth harrows. A more effective working of the soil by spring teeth of the type described hereinbefore and employed in an implement embodying my invention above described is evidenced in a collateral manner by the fact that it requires substantially twice as much draw bar pull to propel a given number of teeth through the soil as is required in prior spring tooth harrows; and by the fact that the teeth wear away much more rapidly than in prior practice and has, I find, rendered it necessary to provide teeth of especially hard alloy such for example as vanadium steel to provide a suitable length of life therefor.

In other words, by employing relatively stiff spring teeth and by holding them to their work by the weight of the implement as a whole, including the heavy gang of discs 10, and by holding the forward end of the frame carrying the spring teeth downwardly by the suction of the dished disc gangs 72 and 73, and by preventing the lateral shifting of the implement and the spring teeth by the interlocked engagement of the V-shaped peripheries of the disc gang 10 with the soil and of the dished discs 74 with the soil, a novel mode of operation of the spring teeth which I employ is effected. When this is combined with the action of the dished discs preceding and the V-shaped discs following the spring teeth, soil may be prepared for seeding to substantially a uniform depth and by one passage of the implement over the ground in an improved manner.

Furthermore, the difficulties attending the raising and lowering of spring teeth from and into the ground where the implement provided with spring teeth is drawn by a tractor and which withdrawal of the teeth is necessary in maneuvering the implement, for example in turning at the end of a field, have been completely overcome by the implement above described. To raise the teeth out of the ground it is only necessary to stop the tractor and reverse it for a short distance, the reverse draft of the tractor being applied to pull the teeth out of the ground. The automatic mechanism described then holds them out of the ground and the tractor may exert forward draft to pull the implement around into any position or turn it at the end of a field; and when it is desired again to project the spring teeth into the ground, it is only necessary to exert a pull on the rope above described which may be adjacent to the hand of the operator on the tractor, whereupon the forward draft of the tractor is utilized to pull the spring teeth into the soil to the predetermined adjustable depth and hold them there to their work.

In instances where the soil to be worked is relatively soft and where there is little tendency for the spring teeth to spring or jump out of the ground, the forward disc unit 41 comprising the disc gangs 72 and 73 may be omitted. Such a form is shown in Fig. 5. Where a tractor is used as the source of draft power, the draw bar 42 of the tractor may be hitched directly to a clevis 90 depending from the forward end of the draft bar 28 and provided with a vertical series of holes to selectively vary the elevation of the front end of the implement. Where horses are used as the source of draft power, an auxiliary truck, shown generally at 93 and which may be of known form, may be provided having a clevis 94 adapted to be engaged by the draft bar 42 of the tractor and having a rearwardly extending arm or tongue 95 adapted to engage the king pin 40 in the manner described above.

The implement of Fig. 5 may be used not only for tilting the soil generally as above described, but may be used for cultivating row crops with very superior results. In such cases it may be desirable to substitute for the discs 9—9 having V-shaped peripheries in the rear gang 10, discs or so-called wheel hoes of the toothed variety also well known in this art. Such toothed wheel hoes are illustrated in the modification of Fig. 5.

In Fig. 6 is illustrated in simplified plan view and to a smaller scale an implement such as that of Fig. 5 comprising a rear gang of wheel hoes and two gangs forwardly thereof of spring teeth; and illustrating the arrangement of the teeth and wheel hoes when the implement is to be used for cultivating a row crop such as corn. In this form of implement, the spring teeth of the intermediate gang are arranged as they would be if the gang 19 of Fig. 2 had removed therefrom the third spring tooth from each end; and the forward gang of spring teeth is arranged as the gang 18 of Fig. 2 would be if the second tooth from each end were removed. This provides spaces which may straddle two rows of corn or the like, indicated generally at 100—100. The wheel hoes 101—101 are arranged in two gangs on the same shaft, 102 and 103 each gang comprising preferably five wheel hoes and each gang being disposed so that its middle portion will run directly on the rows 100—100. The spring teeth thus will cultivate the soil between the rows and the wheel hoes will cultivate the soil adjacent the rows and actually in the rows between adjacent plants. As is well known, wheel hoes have been proposed which may be operated with their teeth running directly in the rows of plants to mulch the soil and kill weeds in the row without injury to the crop itself.

As will now be apparent, by means of a single combined tillage implement, all of the operations of preparing a seed bed and of cultivating a crop such as corn up to the time at which it may be laid by, may be performed efficiently and at the minimum of cost both for implement equipment outlay and for labor time consumed in the tillage operations. A wide swath of the soil may be prepared at each passage over the field and thus a great acreage can be prepared as a seed bed with a moisture conserving mulch thereon when the soil conditions are just right for tillage and before weather conditions can change, so that the seed can be planted at the most opportune time. The further advantage, therefore, of greater yield is had with the above described implement embodying my invention.

I claim:

1. In a tillage implement, a first frame, a transverse shaft on a rearward portion of the frame, a gang of discs having generally V-form peripheries individually rotatable on the shaft, a transverse gang of spring teeth on a forward portion of the frame, a draft tongue forwardly and rearwardly movable on the frame by forward and rearward draft thereon, a generally vertical king pin on the tongue for application of draft thereto, a second frame forwardly of the first frame pivoted to the king pin, a pair of gangs of rotatable dished discs on the second frame adjustably movable to opposite acute angles to the direction of draft, a draft tongue on the second frame having a draft hitch element thereon, the gangs of dished discs adapted to roll on the ground to till the same and normally supporting the second frame and normally supporting the forward portion of the first frame by supporting a forward portion of the draft tongue, and the said rearward gang of discs adapted to roll on the ground and support the rearward portion of the first frame, mechanism operable by forward draft on the draft tongue for projecting the spring teeth into the soil to a predetermined depth, and the tendency of the spring teeth to spring upwardly out of the ground being counteracted by the weight of the first frame and first-named disc gang and by the weight and suction of the dished disc gangs to cause the teeth to work the ground substantially at a predetermined constant depth.

2. In a tillage implement, a frame, a gang of teeth oscillatably mounted on the frame, a lever for oscillating the teeth to withdraw them from the soil or thrust them into it, a draft element forwardly and rearwardly movable on the frame adapted for application of draft thereto, a bell crank pivoted on the frame and connected at one arm by a link to the lever and at another arm by another link to the draft element to effect teeth withdrawing movement thereof upon rearward draft effected movement of the draft element and to effect teeth thrusting movement thereof upon forward draft effected movement of the draft element, and hook and latch elements one supported by the draft element and the other by the frame operable to optionally maintain the draft element in rearward position during forward draft thereon.

3. In a tillage implement, a frame, a gang of teeth oscillatably mounted on the frame, a lever for oscillating the teeth to withdraw them from the soil or thrust them into it, a draft element forwardly and rearwardly movable on the frame adapted for application of draft thereto, a bell crank pivoted on the frame and connected at one arm by a link to the lever and at another arm by another link to the draft element to effect teeth withdrawing movement thereof upon rearward draft effected movement of the draft element and to effect teeth thrusting movement thereof upon forward draft effected movement of the draft element.

4. In a tillage implement, a frame, a gang of teeth oscillatably mounted on the frame, a lever for oscillating the teeth to withdraw them from the ground or thrust them into it, a draft element forwardly and rearwardly rectilinearly slidable on the frame, anti-friction guide means for the draft element on the frame, the draft element adapted for application of draft thereto, a bell crank pivoted on the frame connected at one arm by a link to the lever and at another arm by another link to the draft element to effect tooth-withdrawing movement of the lever upon rearward draft-effected movement of the draft element and to effect tooth thrusting movement thereof upon forward draft-effected movement of the draft element.

5. In a tillage implement, a frame, a gang of teeth oscillatably mounted on the frame, a lever for oscillating the teeth to withdraw them from the soil or thrust them into it, a draft element forwardly and rearwardly movable on the frame, a bell crank pivoted on the frame connected at one arm by a link to the lever and at another arm by another link to the draft element to effect tooth-withdrawing movement of the lever upon rearward draft-effected movement of the draft element and to effect a thrusting movement thereof upon forward draft-effected movement of the draft element, and adjustable stop means to limit forward movement of the draft element comprising an element adjustable forwardly and rearwardly on the draft element and stopped by engagement with a portion of the frame.

6. In a tillage implement, a first frame, a transverse shaft on a rearward portion of the frame, a gang of ground working discs rotatable on the shaft, a transverse gang of spring teeth on a forward portion of the frame, a draft element having a portion forwardly and rearwardly movable on the frame by forward and rearward draft thereon, a generally vertical king pin on the draft element portion for application of draft thereto, a second frame forwardly of the first frame pivoted to the king pin, a pair of gangs of rotatable dished discs on the second frame, a draft hitch element on the second frame, the gangs of dished disks adapted to roll on the ground to till the same and normally supporting the second frame and normally supporting the forward portion of the the first frame by supporting the draft element portion, and the said rearward gang of discs adapted to roll on the ground and support the rearward portion of the first frame, mechanism operable by forward draft on the hitch element for projecting the spring teeth into the soil to a predetermined depth, and the tendency of the spring teeth to spring upwardly out of the ground being counteracted by the weight of the first frame and first-named disc gang and by the weight and suction of the dished disc gangs to cause the teeth to work the ground substantially at a predetermined constant depth.

RAY E. DUNHAM.